(12) United States Patent
Kerp et al.

(10) Patent No.: US 12,105,223 B2
(45) Date of Patent: Oct. 1, 2024

(54) OPTOELECTRONIC SENSOR AND METHOD FOR DETECTING OBJECTS

(71) Applicant: SICK AG, Waldkirch (DE)

(72) Inventors: Michael Kerp, Waldkirch (DE); Markus Mössner, Waldkirch (DE)

(73) Assignee: SICK AG, Waldkirch (DE)

( * ) Notice: Subject to any disclaimer, the term of this patent is extended or adjusted under 35 U.S.C. 154(b) by 940 days.

(21) Appl. No.: 17/143,668

(22) Filed: Jan. 7, 2021

(65) Prior Publication Data
US 2021/0215802 A1 Jul. 15, 2021

(30) Foreign Application Priority Data

Jan. 10, 2020 (DE) .......................... 102020100452.4

(51) Int. Cl.
*G01S 7/48* (2006.01)
*G01S 7/481* (2006.01)
*G01S 17/42* (2006.01)
*G08C 17/02* (2006.01)

(52) U.S. Cl.
CPC .......... *G01S 7/4817* (2013.01); *G01S 7/4814* (2013.01); *G01S 17/42* (2013.01); *G08C 17/02* (2013.01)

(58) Field of Classification Search
USPC ........................................................ 356/5.01
See application file for complete search history.

(56) References Cited

U.S. PATENT DOCUMENTS

| 7,187,823 B2 | 3/2007 | Dimsdale et al. |
| 8,520,221 B2 * | 8/2013 | Lohmann ................ G01S 17/42 356/614 |
| 10,481,269 B2 * | 11/2019 | Pacala .................... B60L 3/0015 |

(Continued)

FOREIGN PATENT DOCUMENTS

| CN | 205986584 U | 2/2017 |
| DE | 4340756 A1 | 6/1994 |

(Continued)

OTHER PUBLICATIONS

European Search Opinion for EP 3,848,721 (3 pages) (Year: 2021).*
Office Action dated Jan. 21, 2021 issued in corresponding German Application No. 102020100452.4.

*Primary Examiner* — James R Hulka
(74) *Attorney, Agent, or Firm* — Nath, Goldberg & Meyer; Jerald L. Meyer

(57) ABSTRACT

An optoelectronic sensor for the detection of objects in a monitored zone is provided that has a light transmitter for transmitting a light beam, a light receiver for generating a received signal from the light beam remitted by the objects in the monitored zone, a control and evaluation unit for the detection of information on the objects with reference to the received signal, a base unit, a scanning unit movable with respect to the base unit for the periodic scanning of the monitored zone, and a drive having a hollow shaft for moving the scanning unit, wherein the scanning unit comprises a first data transmission unit and the base unit comprises a second data transmission unit to exchange data wirelessly between the base unit and the scanning unit through the hollow shaft, The first data transmission unit and the second data transmission unit are configured as microwave units for the data exchange by means of microwave signals.

8 Claims, 2 Drawing Sheets

(56) References Cited

U.S. PATENT DOCUMENTS

Figure 1:
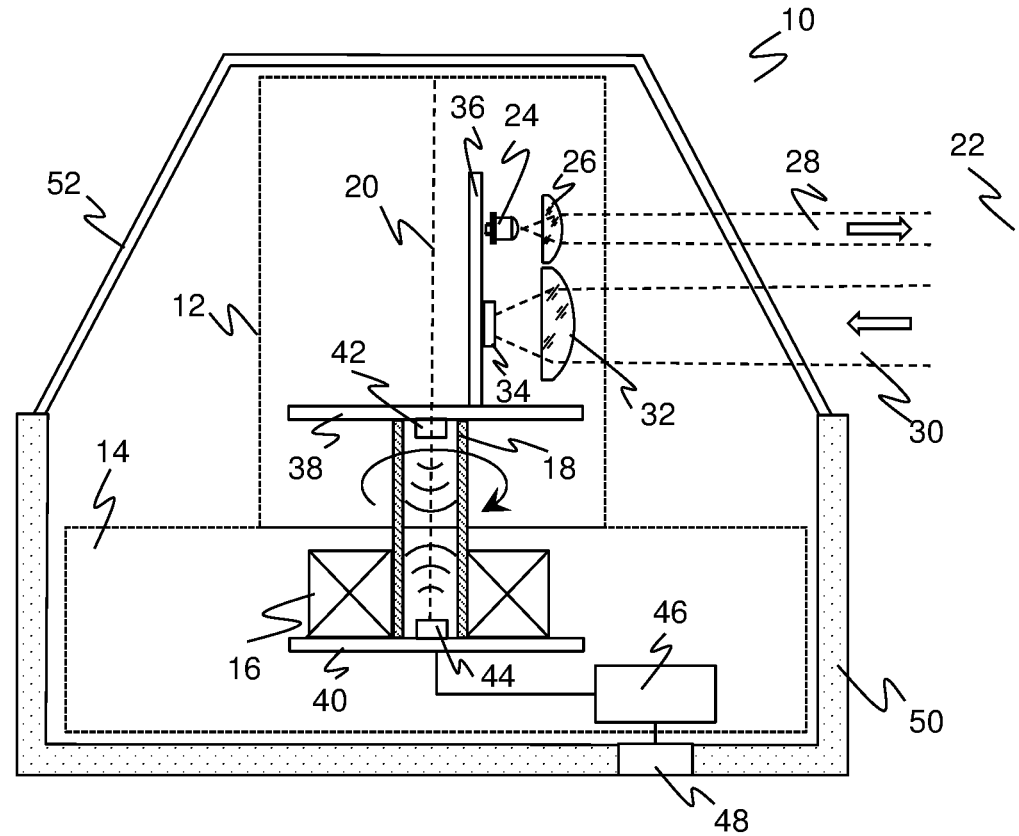

| | | | |
|---|---|---|---|
| 11,367,935 B2 * | 6/2022 | Ravanelli | H01P 1/173 |
| 2005/0279914 A1 * | 12/2005 | Dimsdale | G01C 15/002 |
| | | | 250/205 |
| 2011/0286009 A1 | 11/2011 | Lohmann | |
| 2019/0179028 A1 | 6/2019 | Pacala et al. | |
| 2019/0335074 A1 * | 10/2019 | Malkes | H04N 23/74 |
| 2020/0136220 A1 * | 4/2020 | Ravanelli | H01P 5/024 |

FOREIGN PATENT DOCUMENTS

| | | |
|---|---|---|
| DE | 19757849 B4 | 12/2004 |
| EP | 2388619 A1 | 11/2011 |
| EP | 2933655 A1 | 10/2015 |
| EP | 2961087 A1 | 12/2015 |
| EP | 3233227 B1 | 3/2020 |
| WO | 9810487 A1 | 3/1998 |
| WO | 2008/008970 A2 | 1/2018 |

\* cited by examiner

OPTOELECTRONIC SENSOR AND METHOD FOR DETECTING OBJECTS

The invention relates to an optoelectronic sensor and to a method for detecting objects.

Optoelectronic sensors, and in particular laser scanners, are suitable for distance measurements which require a large horizontal angular range of the measurement system. In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light.

The location of an object in the monitored zone is detected in two-dimensional polar coordinates using the angular data and the distance data. The positions of objects can thus be determined or the contour of an object can be determined by a plurality of scans of said same object at different positions. In addition to such measurement applications, laser scanners are also used in safety technology for monitoring a danger source, such as a dangerous machine. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Sensors used in safety technology have to work particularly reliably and must therefore satisfy high safety demands, for example the EN13849 standard for safety of machinery and the machinery standard EN1496 for electrosensitive protective equipment (ESPE).

The scanning of the monitored plane in a laser scanner is typically achieved in that the transmitted beam is incident onto a rotating mirror. The light transmitter, light receiver, and associated electronics and optics are fixedly installed in the device and do not also execute the rotary movement. It is also known to replace the rotating mirror by a scanning unit which is also moved. For example in DE 197 57 849 B4, the total measurement head with the light transmitter and light receiver rotates.

With a rotating measurement head, the demand arises to transmit data and energy into the rotating part or to read date from the rotating part. A plurality of techniques are conceivable for this purpose. One possibility is the radio frequency technique. The carrier frequency generation and the modulation and demodulation for the data transmission require resources on, for example, an FPGA (field programmable gate array) and various further components are necessary such as RF filters, near field antennas, and circuit boards. There is additionally a certain electromagnetic irradiation and conversely sensitivity to external electromagnetic fields. Interference can also occur due to interactions between an energy transmission and a data transmission, with these influences being able to be reduced by a skillful selection of the frequency band.

The complexity of a radio frequency interface could generally be reduced by microwave chips available on the market in which the complete radio frequency technique is integrated with or without an antenna. However, this only works over very short distances that are not sufficient to bridge the required distance between a base module and one or more transmission/reception modules.

Generally known communications protocols such as Bluetooth or wireless LAN require country specific frequency licenses and the range for a purely point to point link is additionally undesirably high within a laser scanner, while the data rate remains limited. In other words, the power and requirement of such universal protocols are not a good fit for the special situation in a laser scanner.

A laser scanner is known from EP 2 388 619 A1 that has a rotatable transmission/reception unit that is supplied with energy in accordance with the transformation principle by the rotationally fixed regions of the sensor, while the data transmission takes place wirelessly by radio or in an optical manner. These wireless interfaces are, however, then not explained in detail. WO 2008/008970 A2 presents a multibeam laser scanner having a rotatable housing with a plurality of light transmitters and light receivers. A wireless communication is provided here that is then, however, likewise not described in any more detail.

U.S. Pat. No. 7,187,823 B2 describes a system of transmitting power and an optical signal between components of a monitoring device. Two ring cores rotate with respect to one another here, while the optical transmission takes place through apertures in their centers.

In EP 2 933 655 A2, two circuit boards in a base unit and a scanning unit of a laser scanner rotate with respect to one another to inductively supply the scanning unit and to exchange data capacitively. The capacitive data transmission only works at this close distance of the circuit boards due to the signal losses that are otherwise too large and a high bandwidth of the data exchange makes special demands with respect to interfering emissions and immunity to interference.

CN 205986584 U deals with a laser scanner that utilizes wireless power transmission. There is also a certain data communication in this process, for instance to ideally set the power to be transmitted. A standard for the power transmission such as the Qi standard is, however, not designed and is not suitable for a high bandwidth or data rate.

It is therefore the object of the invention to provide an optoelectronic sensor having improved data communication between a stationary and a rotating part.

This object is satisfied by an optoelectronic sensor and by a method for detecting objects in accordance with the respective independent claim. The sensor transmits a light beam by means of a light transmitter and converts the light beam returning from the monitored zone in a light receiver into a received signal that is then widened to acquire properties of the objects. A distance value is preferably determined using a time of flight process here. The sensor can also have multiple beams, that is it can transmit and receive a plurality of light beams using a plurality of light transmitters and/or beam splitters or the like as well as using a plurality of light receivers or also a pixel matrix.

A scanning unit moves or rotates with respect to a base unit of the sensor for a periodic scanning of the monitored zone. Light transmitters and light receivers are preferably accommodated in the scanning unit so that the scanning unit forms a movable or rotating measurement head. The movement is generated by a drive that has a hollow shaft. First and second data transmission units are provided for a wireless communication between the base unit and the scanning unit through the hollow shaft. The data exchange does not only relate to some parameters, but preferably also to the measurement data themselves. In this respect, certain processing stages are already conceivable in the scanning unit so that, depending on the embodiment, the received signals themselves or evaluation results of the most various stages are transmitted, for instance the determined times of flight. An interface of a correspondingly high bandwidth or data rate is at least required for the large data volume of the measurement.

The invention starts from the basic idea of transmitting the data by microwave. The data transmission units are configured as microwave units for this purpose. The microwave signals are transmitted within the hollow shaft.

The invention has the advantage that large data volumes that are also sufficient for the measurement data of a laser scanner can be transmitted by microwave due to the large bandwidth that is available in a very small space within the hollow shaft A simple and inexpensive design is possible here with minimal connection technology and few required parts. A screen is furthermore achieved by the accommodation in the hollow shaft that considerably improves the irradiation behavior and the susceptibility to electromagnetic waves.

The first data transmission unit and/or the second data transmission unit preferably has/have an integrated microwave communication chip. Such microwave communication chips are available as complete parts ("single chip") and can be adapted to the specific application with little effort, for instance in conjunction with an FPGA or a microcontroller of the control and evaluation unit. It is alternatively conceivable to accommodate a function of the data transmission units on a circuit board, in an FPGA, or a microcontroller of the control and evaluation unit.

A hollow conductor is preferably arranged in the hollow shaft, more preferably as a circular hollow shaft. Said microwave communication chips originally only have a range of a few millimeters that is normally not yet sufficient to connect the base unit and the scanning unit. The required distance is overcome by the hollow conductor. The hollow conductor can be at rest connected to the base unit or rotate with the scanning unit. A small distance is preferably provided on the respective opposite side to permit the movement between the base unit and the scanning unit. An energy transmission that is completely independent of the data transmission can be arranged at the outside at the hollow conductor. In principle, alternatively to a separate hollow conductor in the hollow shaft, it is conceivable that the hollow shaft itself is configured as a hollow conductor or acts as such. However, this does not allow as much flexibility or freedom of design for the hollow conductor and, for example, precludes a separate energy transmission outside the hollow conductor and at the same time inside the hollow shaft.

The first data transmission unit and/or the second data transmission unit is/are preferably configured for the transmission and/or reception of linearly polarized microwave signals. This makes possible a particularly simple design of the data transmission units or of their antennas. Microwave communication chips available on the market likewise work with linear polarization.

At least one polarizer for the conversion of linearly polarized microwave signals into circularly polarized microwave signals is preferably arranged in the communication link between the data transmission units, in particular in the hollow shaft. On the use of linearly polarized microwaves, the problem results due to the relative movement between the base unit and the scanning unit that the polarization directions are not suitable in dependence on the rotational position. This results in a damping dependent on the rotational position. This dependency on the rotational position is eliminated by the circular polarization and the data transmission therefore becomes substantially more robust.

The first data transmission unit and/or the second data transmission unit is/are preferably configured for the transmission and/or reception of circularly polarized microwave signals. This is an alternative to a combination of linearly polarized microwaves that are converted into circularly polarized microwaves by a polarizer. The polarizer can thereby be dispensed with. The data transmission units are then correspondingly more complex, for example by use of two antennas rotated by 90° with respect to one another and having a corresponding feed.

The method in accordance with the invention can be further developed in a similar manner and shows similar advantages in so doing. Such advantageous features are described in an exemplary, but not exclusive manner in the subordinate claims dependent on the independent claims.

Figure 2:
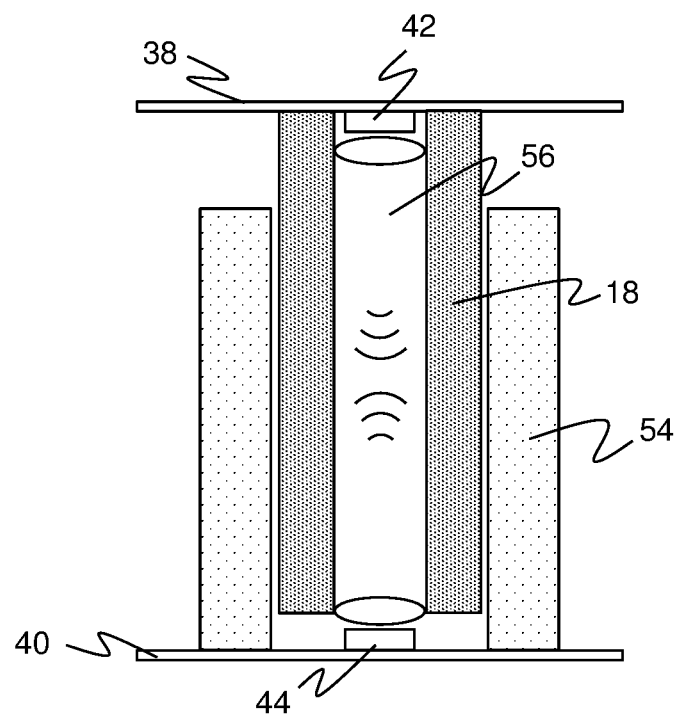
Figure 3:
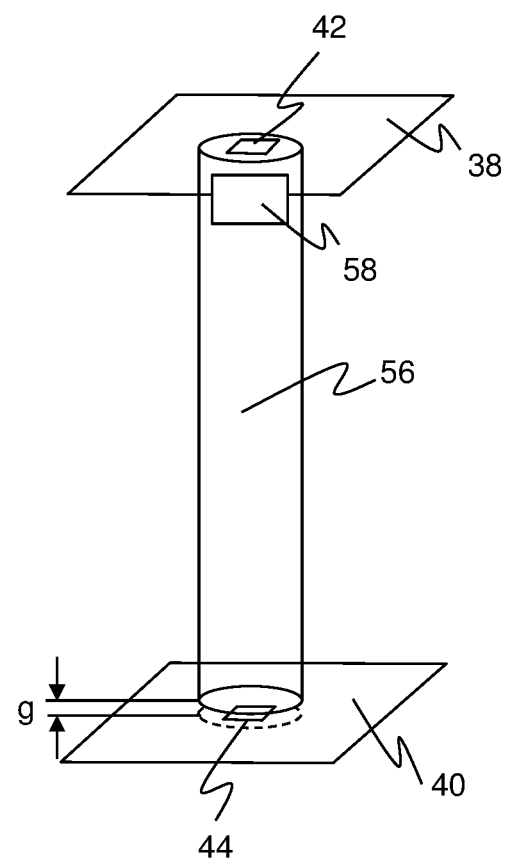

The invention will be explained in more detail in the following also with respect to further features and advantages by way of example with reference to embodiments and to the enclosed drawing. The Figures of the drawing show in:

FIG. 1 a schematic sectional representation through a laser scanner;

FIG. 2 an enlarged representation of a microwave transmission path of the laser scanner within a hollow shaft of the drive; and FIG. 3 a further representation of a microwave transmission path within a hollow shaft in an embodiment having additional polarizers for circular polarization.

FIG. 1 shows a schematic sectional representation through an optoelectronic sensor in an embodiment as a laser scanner 10. The laser scanner 10 in a rough distribution comprises a movable scanning unit 12 and a base unit 14. The scanning unit 12 is the optical measurement head, whereas further elements such as a supply, evaluation electronics, terminals and the like are accommodated in the base unit 14. In operation, the scanning unit 12 is set into a pivoting or rotational movement about an axis of rotation 20 with the aid of a drive 16 of the base unit 14 that is designed as a hollow shaft drive having a hollow shaft 18 to thus periodically scan a monitored zone 22.

In the scanning unit 12, a light transmitter 24 generates a transmitted light beam 28 with the aid of a transmission optics 26, the transmitted light beam 28 being transmitted into the monitored zone 22. If the transmitted light beam 28 is incident on an object in the monitored zone 22, a corresponding light beam returns to the laser scanner 10 as remitted light 30. The remitted light 30 is guided by a reception optics 32 onto a light receiver 34 and is converted there into an electrical received signal. The light transmitter 24 and the light receiver 34 are accommodated on a circuit board 36 that is connected to a further circuit board 38 or is formed together with it as a flex board, for example.

A circuit board 40 of the base unit 14 is provided in parallel with the circuit board 38 of the scanning unit 12, with the hollow shaft 18 therebetween. A first data transmission unit 42 of the scanning unit 12 and a second data transmission unit 44 of the base unit 14 are accommodated on the two circuit boards 38, 40 to exchange data between the scanning unit 12 and the base unit 14 through the hollow shaft 18. A control and evaluation unit 42 in the base unit 14 is connected via this communication channel to the circuit board 38 and above it to the circuit board 36 and thus to the light transmitter 24 and light receiver 34. The control and evaluation function can largely be freely distributed between these components 36, 38, 40, and 46 and will be described in simplified terms in the following as if only the control and evaluation unit 46 was responsible therefor. The division into two circuit boards 36, 38 in the scanning unit 12 is accordingly purely exemplary, as is their arrangement and orientation. That part of the evaluation could, for example, take part in the scanning unit 12 that is related to a pre-processing or to a raw data processing. A complete measurement data evaluation in the scanning unit 12 is also conceivable solely with a communication of end results.

The control and evaluation unit 46 evaluates the received signal, controls the drive 16, and receives the signal of an angle measurement unit which is not shown and which determines the respective angular position of the scanning unit 12. The distance from a sampled object is measured for the evaluation, preferably using a time of flight process. The transmitted light of the light transmitter 24 is modulated in a phase-based system for this purpose and a phase relation to the received signal of the light receiver 34 is evaluated. Alternatively, in a pulse-based system, short light pulses are transmitted at a transmission point in time and their reception point in time is determined from the received signal. In this respect, both individual pulse processes which respectively determine a distance from a single transmitted pulse and pulse averaging processes in which the received signal is collected and statistically evaluated after a plurality of successively following transmitted pulses are conceivable. The respective angular position at which the transmitted light beam 28 was respectively transmitted is likewise known by the angle measurement unit. Two-dimensional polar coordinates of all the object points in a scanning plane are thus available with the angle and the distance after every scan period, that is every revolution of the scanning unit 12, via the angle and distance. In other embodiments having a plurality of scanning beams and/or an additional scan movement, three-dimensional coordinates are also produced.

These measurement results can be output via a sensor interface 48. The sensor interface 48 or a further terminal, not shown, conversely serves as a parameterization interface. In applications in safety technology, protected fields which can be configured in the monitored zone 22 are monitored for unauthorized intrusions and thereupon a safety-directed switch-off signal is optionally output via the then safely configured interface 48 (e.g. OSSD, output signal switching device). The laser scanner 10 is accommodated in a housing 50 that is closed toward the top by a hood 52 having a front screen revolving around the axis of rotation 20.

The laser scanner 10 in accordance with FIG. 1 is only an embodiment. The invention deals less with the specific design of the laser scanner 10 and more with the data transmission by microwave through the hollow shaft 18 that will be explained in more detail with reference to FIGS. 2 and 3. Alternatively to the specific adaptation of the laser scanner 10 in accordance with FIG. 1, any other arrangement known per se of single-beam optoelectronic sensors or laser scanners would be possible such as a double lens having transmission optics at the center of a reception lens or the use of a beam splitter mirror. Furthermore, multi-beam laser scanners are also conceivable in which a plurality of light transmitters and/or optical beam splits generate a plurality of transmitted light beams that are correspondingly received by a plurality of light receivers, in particular in the form of light reception elements of an image sensor arranged in a pixel-like manner. Combining a respective plurality of beams in a module and achieving a larger number of beams by a multiple arrangement of such modules is also advantageous. Detection modules rotating in the scanning unit 12 can also operate without a time of flight measurement, can, for example, be camera modules or can use non-optical detection principles such as radar or ultrasound.

FIG. 2 shows the communication link between the circuit boards 38, 40 and their data transmission units 42, 44 in an enlarged representation. The hollow shaft 18 forms the rotor of the drive 16 within a stator 54. The upper circuit board 38 consequently rotates with the hollow shaft 18, while the lower circuit board 40 is stationary with the stator 54. A hollow conductor 56, preferably a circular hollow shaft, is provided in the hollow shaft 18 to transmit the microwaves between the data transmission units 24, 44. Alternatively, the hollow shaft 18 already acts as a hollow conductor itself.

The data transmission units 42, 44 are preferably fully integrated microwave chips. In addition to the great advantage that a complete component can be used, the frequency licensing is thereby also facilitated by taking it over from the respective manufacturer. A frequency band of particular interest is in the license-free range at 60 GHz or 122 GHz that is also disposed far from high field strengths in otherwise used low frequency ranges and thus promises advantages with respect to EMC (electromagnetic compatibility).

The microwave chips can already have integrated antennas. This makes the arrangement even more compact. Alternatively, antennas and the circuits for generating, receiving, modulating, and demodulating the microwaves are separate from one another. Such antennas can, for example, be designed as patch antennas.

A disadvantage in the use of existing integrated microwave chips for data transmission is their small range of only a few millimeters, particularly in the case of integrated antennas. However, this is overcome by the hollow conductor 56 in accordance with the invention.

FIG. 3 again shows the communication link in a further embodiment. So that the hollow conductor 56 can also perform the rotational movement of the scanning unit 12, a small gap g from the lower circuit board 40 of the base unit 14 is provided. The arrangement could also be reversed, that is the hollow conductor 56 could be stationary and could be connected to the lower circuit board 40, with then the corresponding gap g preferably remaining at the top with respect to the rotating circuit board 38.

On the use of linearly polarized microwaves, a problem results due to the changing orientation in the course of the rotational movement of the scanning unit 12. The data transmission units 42, 44 are only suitable in two angular positions aligned by 0° or 180° with respect to one another to ideally transmit linearly polarized microwaves. With a 90° offset, in contrast, extreme damping occurs because the microwaves are received exactly with the incorrect orientation, that is, for example, horizontally polarized microwaves arrive even though the receiving data transmission unit 42, 44 is oriented for the reception of vertically polarized microwaves at that time. Corresponding gradual damping results in the intermediate positions.

This can be eliminated in that circularly polarized microwaves are used. However, this requires a comparatively complex antenna structure. The preferably used fully integrated microwave chips in particular generate typically linearly polarized microwaves. It is therefore advantageous to use at least one polarizer 58 that is placed in the hollow shaft 56. The polarizer 58 converts arriving linearly polarized microwaves into circularly polarized microwaves and the data transmission units 42, 44 themselves can therefore continue to be configured for linearly polarized microwaves. The transmission of microwaves between a circularly polarized member and a linearly polarized member causes damping of approximately 3 dB. This is, however, acceptable, particularly since this constellation has the great advantage that there is no longer any noticeable signal collapse, that is the data transmission becomes independent of the rotational position of the scanning unit 12 and the extreme damping at a 90° offset is above all prevented. The arrangement of the polarizer 58 at the first data transmission unit 42 is to be understood as purely exemplary; alternatively, the polarizer 58 can be arranged at the second data transmission unit 44 or somewhere therebetween. A plurality of polarizers would also be conceivable.

The invention claimed is:

1. An optoelectronic sensor for the detection of objects in a monitored zone, the optoelectronic sensor comprising:
    a light transmitter for transmitting a light beam;
    a light receiver for generating a received signal from the light beam remitted by the objects in the monitored zone;
    a control and evaluation unit configured for detection of information on the objects with reference to the received signal;
    a base unit;
    a scanning unit movable with respect to the base unit for periodic scanning of the monitored zone; and
    a drive having a hollow shaft for moving the scanning unit,
    wherein the scanning unit comprises a first data transmission unit and the base unit comprises a second data transmission unit to exchange data wirelessly between the base unit and the scanning unit through the hollow shaft,
    wherein the first data transmission unit and the second data transmission unit are configured as microwave units for data exchange by means of microwave signals,
    wherein at least one of the first data transmission unit and the second data transmission unit is configured for the transmission and/or reception of linearly polarized microwave signals, and
    wherein at least one polarizer for conversion of the linearly polarized microwave signals into circularly polarized microwave signals is arranged in a communication path between the first and second data transmission units.

2. The optoelectronic sensor in accordance with claim 1, wherein the optoelectronic sensor is a laser scanner.

3. The optoelectronic sensor in accordance with claim 1, wherein the exchanged data comprises the received signal or data derived therefrom.

4. The optoelectronic sensor in accordance with claim 1, wherein at least one of the first data transmission unit and the second data transmission unit has an integrated microwave communication chip.

5. The optoelectronic sensor in accordance with claim 1, wherein a hollow conductor is arranged in the hollow shaft.

6. The optoelectronic sensor in accordance with claim 1, wherein the at least one polarizer is arranged in the hollow shaft.

7. The optoelectronic sensor in accordance with claim 1, wherein at least one of the first data transmission unit and the second data transmission is configured for transmission and/or reception of circularly polarized microwave signals.

8. A method of detecting objects in a monitored zone, comprising:
    transmitting a light beam into the monitored zone;
    receiving the light beam after the light beam is remitted from the objects in the monitored zone;
    generating a received signal from the light beam after it is received;
    evaluating the received signal for detection of information on the objects;
    periodically scanning the monitored zone using a scanning unit which moves relative to a base unit by means of a drive having a hollow shaft; and
    wirelessly exchanging data between the scanning unit and the base unit through the hollow shaft by means of a first data transmission unit and a second data transmission unit,
    wherein the first data transmission unit and the second data transmission unit exchange the data by means of microwave signals,
    wherein at least one of the first data transmission unit and the second data transmission unit is configured for the transmission and/or reception of linearly polarized microwave signals, and
    wherein at least one polarizer for conversion of the linearly polarized microwave signals into circularly polarized microwave signals is arranged in a communication path between the first and second data transmission units.

* * * * *